(12) United States Patent
Ouin et al.

(10) Patent No.: US 10,966,804 B2
(45) Date of Patent: Apr. 6, 2021

(54) CONNECTING ELEMENT, A BASE UNIT AND A CLEANING HEAD FOR USE IN AN ORAL CARE APPLIANCE

(71) Applicant: Willo 32 SAS, Limoges (FR)

(72) Inventors: Jean-Raphaël Ouin, Paris (FR); Alexandre Georges Gabriel Laurent, Brooklyn, NY (US)

(73) Assignee: Willo 32 SAS, Limoges (FR)

( * ) Notice: Subject to any disclaimer, the term of this patent is extended or adjusted under 35 U.S.C. 154(b) by 0 days.

(21) Appl. No.: 16/270,316

(22) Filed: Feb. 7, 2019

(65) Prior Publication Data

US 2020/0253703 A1 Aug. 13, 2020

(51) Int. Cl.

| A61C 17/22 | (2006.01) |
|---|---|
| A46B 5/00 | (2006.01) |
| A46B 9/04 | (2006.01) |
| A46B 11/06 | (2006.01) |
| A46B 13/02 | (2006.01) |
| A46B 13/04 | (2006.01) |
| A46B 15/00 | (2006.01) |
| A61C 1/07 | (2006.01) |
| A61C 17/02 | (2006.01) |
| A61C 17/26 | (2006.01) |

(52) U.S. Cl.
CPC .......... *A61C 17/221* (2013.01); *A46B 5/0095* (2013.01); *A46B 9/045* (2013.01); *A46B 11/063* (2013.01); *A46B 13/023* (2013.01); *A46B 13/04* (2013.01); *A46B 15/0008* (2013.01); *A61C 1/07* (2013.01); *A61C 17/0202* (2013.01); *A61C 17/228* (2013.01); *A61C 17/26* (2013.01); *A46B 2200/1066* (2013.01); *A61C 2204/005* (2013.01)

(58) Field of Classification Search
CPC ..... A61C 17/22; A61C 17/222; A61C 17/225; A61C 17/228
See application file for complete search history.

(56) References Cited

U.S. PATENT DOCUMENTS

| 4,795,347 A | * | 1/1989 | Maurer | A46B 7/06 15/167.2 |
|---|---|---|---|---|
| 5,321,866 A | * | 6/1994 | Klupt | A46B 11/06 15/22.1 |
| 5,501,596 A | * | 3/1996 | Bailey | A61C 17/20 433/119 |
| 6,164,967 A | * | 12/2000 | Sale | A46B 11/002 15/22.1 |

(Continued)

FOREIGN PATENT DOCUMENTS

| EP | 2654609 B1 | 3/2018 |
|---|---|---|
| EP | 2654611 B1 | 4/2018 |

(Continued)

OTHER PUBLICATIONS

International Search Report and Written Opinion dated May 6, 2020 from International Application No. PCT/IB2020/050844, 11 pages.

*Primary Examiner* — Ralph A Lewis
(74) *Attorney, Agent, or Firm* — Daylight Law, P.C.

(57) ABSTRACT

A connecting element, a base unit and a cleaning head for use in an oral care appliance are disclosed. The connecting element is configured to engage operatively with the cleaning head and the base unit to form a first connection and a second connection respectively.

13 Claims, 9 Drawing Sheets

(56) References Cited

U.S. PATENT DOCUMENTS

| | | | |
|---|---|---|---|
| 6,611,780 B2* | 8/2003 | Lundell | A61C 17/22 433/27 |
| 7,020,925 B1* | 4/2006 | Gitelis | A61C 17/222 15/22.1 |
| 7,080,980 B2* | 7/2006 | Klupt | A61C 17/222 15/167.1 |
| 7,082,638 B2 | 8/2006 | Koh | |
| 7,537,451 B1 | 5/2009 | Ramnarine | |
| 8,359,692 B2* | 1/2013 | Brewer | A46B 9/045 15/167.2 |
| 8,448,282 B2 | 5/2013 | Stapelbroek | |
| 8,578,539 B2* | 11/2013 | Jousma | A61C 17/222 15/167.1 |
| 8,617,090 B2* | 12/2013 | Fougere | A61C 17/0211 601/160 |
| 8,635,731 B2 | 1/2014 | Garner | |
| 8,667,634 B2 | 3/2014 | Steur | |
| 8,745,802 B2 | 6/2014 | Steur | |
| 8,863,346 B2 | 10/2014 | Headstrom | |
| 8,978,189 B1 | 3/2015 | Sexton | |
| 8,990,992 B2 | 3/2015 | Stapelbroek | |
| 9,084,655 B2 | 7/2015 | Sahoo | |
| 9,277,980 B2 | 3/2016 | Leveling | |
| 9,308,065 B2 | 4/2016 | Steiner | |
| 9,504,542 B2 | 11/2016 | De Gentile | |
| 9,526,597 B2 | 12/2016 | Steur | |
| 9,636,195 B2 | 5/2017 | Wolpo | |
| 9,636,197 B2 | 5/2017 | Khangura | |
| 9,668,840 B2 | 6/2017 | Miller | |
| 9,907,633 B2 | 3/2018 | Wolpo | |
| 2003/0115694 A1 | 6/2003 | Pace | |
| 2003/0165794 A1* | 9/2003 | Matoba | A61C 1/18 433/114 |
| 2007/0184404 A1 | 8/2007 | Johnki | |
| 2013/0014331 A1 | 1/2013 | Garner et al. | |
| 2014/0115800 A1 | 5/2014 | Haynes et al. | |
| 2016/0113745 A1 | 4/2016 | Golub | |
| 2016/0135581 A1 | 5/2016 | Pai | |
| 2016/0206415 A1 | 7/2016 | Kraft | |
| 2016/0270892 A1 | 9/2016 | Yoo | |
| 2017/0367801 A1 | 12/2017 | Fitzgerald | |
| 2018/0000573 A1 | 1/2018 | Miller | |
| 2018/0184795 A1 | 7/2018 | Pai | |
| 2018/0184857 A1 | 7/2018 | Pai | |

FOREIGN PATENT DOCUMENTS

| | | |
|---|---|---|
| WO | 2004024021 A1 | 3/2004 |
| WO | 2017061980 A1 | 4/2017 |
| WO | 2017146366 A1 | 8/2017 |
| WO | 2018160986 A1 | 9/2018 |

* cited by examiner

CONNECTING ELEMENT, A BASE UNIT AND A CLEANING HEAD FOR USE IN AN ORAL CARE APPLIANCE

BACKGROUND OF THE INVENTION

Dental cleaning devices such as electric toothbrushes, oral irrigators, dental water jets or electric flosses intend to provide cleaning results by eradicating the food remains, plaque, etc., from the teeth. Many of these devices are portable devices and have been developed over the years to achieve the purpose of oral hygiene.

There is a need to improve the sanitary standard of the dental cleaning devices while providing satisfactory cleaning results. For example, the brushing head of the dental cleaning device needs to be replaced after a certain period of time as the cleaning elements in the brushing head may get damaged or are no longer efficient to provide the desired cleaning effect. To this end, certain cleaning devices, in particular electric toothbrushes, come with detachable attachments (e.g. detachable brushing heads). However, the coupling between the attachment and a body/handle of the cleaning device may lead to loose connections or fitting of the attachments to the body/handle. Such loose connections may result in a poor grip to the user, generate unwanted clanking noise during operation of the device or cause non-working of the device at all.

Another disadvantage with the loose connections is leakage. The dental cleaning devices having ill fitted connections between the brushing heads and the handle/body portion often have the problem of leakage of fluid going into or coming out of the mouth. Oral care appliances with this problem are prone to cross-contamination. The loose connections may leak out the fluid from the device to the surrounding or to other restricted parts of the device, such as battery box, cleaning agent reservoir, medicament reservoir, electric circuit, etc., which may ultimately damage the device.

Thus, a need exists for a removable brushing/cleaning head or attachments which may be securely and easily engaged or disengaged with a handle or body portion of the dental cleaning device. It is therefore desired to provide an improved connection system between an attachment section and a handle/body of the dental cleaning device. It is also required to enable sharing of more costly components of the dental cleaning device with multiple users.

SUMMARY OF THE INVENTION

Specific embodiments of the present invention disclosed herein relate to the technical field of oral care appliances and methods of use thereof. In particular, specific embodiments of the present invention disclosed herein relate to a connecting element, a base unit and a cleaning head for use in an oral care appliance. The base unit, connecting element, and cleaning head can each be referred to herein as an "element" of the oral care appliance.

Specific embodiments of the present invention provide a solution to overcome one or more of the above-mentioned problems with an oral care appliance. Specific embodiments of the present invention provide an easy-to-maintain and a convenient oral care appliance with better connection or disconnection arrangement(s).

In a specific embodiment of the invention a connecting element, a base unit and a cleaning head for use in an oral care appliance are provided. The oral care appliance may be used for cleaning, whitening, removing plaque, and in other general oral care applications for providing oral care hygiene. The connecting element comprises an identification means, a first connection interface configured to engage operatively with a cleaning head to form a first connection, and a second connection interface configured to engage operatively with a base unit to form a second connection. The first connection interface and/or the second connection interface comprise(s) means to make the first connection stronger than the second connection and/or to limit connection capability of said connecting element in relation to certain compatible cleaning heads.

According to specific embodiments of the invention, the means of the first connection interface and/or the second connection interface may include a coupling arrangement, wherein the coupling arrangement includes a mechanical arrangement, an electronic arrangement or a combination thereof.

According to specific embodiments of the invention, the mechanical arrangement of the connecting element may comprise a plurality of protruding members and each of the plurality of protruding members comprises at least one of a pipe, a lug, a tube or a combination thereof.

According to specific embodiments of the invention, the mechanical arrangement of the connecting element may comprise a keying/locking arrangement.

According to specific embodiments of the invention, the mechanical arrangement of the connecting element may be defined according to at least one of shape, length, diameter, position, or a combination thereof, of the plurality of protruding members.

According to specific embodiments of the invention, the mechanical arrangement of the connecting element may comprise specific keying arrangement configured to engage with corresponding locking arrangement on the cleaning head to ensure sealing of the first connection.

According to specific embodiments of the invention, the mechanical arrangement of the connecting element may comprise a specific locking arrangement configured to engage with corresponding keying arrangement on the base unit to ensure sealing of the second connection.

According to specific embodiments of the invention, material of the first connection interface and/or the second connection interface of the connecting element may be selected to make the first connection stronger than the second connection.

According to specific embodiments of the invention, the first connection interface and the second connection interface of the connecting element may be shaped so that there is a difference between functional clearance of the first connection and the second connection, thereby making the first connection stronger than the second connection.

According to specific embodiments of the invention, the connecting element may be detachable from the cleaning head and base unit by specific action(s) and the specific action(s) can be achieved by one or more of partial of rotation, push or pull operation or a combination thereof.

According to specific embodiments of the invention, the identification means may comprise a communication module, a scannable code, a mechanical arrangement, an electronic arrangement or a combination thereof.

According to specific embodiments of the invention, the communication module may comprise at least one of an NFC module, a Bluetooth module, a WiFi module, or a combination thereof.

According to specific embodiments of the invention, the connecting element may comprise at least one valve to prevent cross-contamination.

According to specific embodiments of the invention, the connecting element may be configured to interact with a connection assembly of the base unit to circulate fluid between the base unit and the cleaning head.

According to specific embodiments of the invention, the connecting element may comprise at least one inflatable pocket.

According to specific embodiments of the invention, the second connection interface of the connecting element may be shaped to open at least one soft valve in the base unit when the connecting element is plugged onto the base unit.

It is yet another object of the invention to provide a base unit for use in an oral care appliance, the base unit comprising a connection interface configured to engage operatively with a connecting element to form a connection, wherein the connection interface comprises means to facilitate disconnection of the connection and/or to limit connection capability of said base unit in relation to certain compatible connecting elements.

According to specific embodiments of the invention, the means of the connection interface of the base unit may include a coupling arrangement, wherein the coupling arrangement includes a mechanical arrangement, an electronic arrangement or a combination thereof.

According to specific embodiments of the invention, the coupling arrangement of the base unit may ensure a sealed connection of the base unit with the connecting element.

According to specific embodiments of the invention, the mechanical arrangement of the base unit may comprise at least one protruding member and each protruding member can comprise a pipe, a lug, a tube or a combination thereof.

According to specific embodiments of the invention, material of the connection interface of the base unit may be selected to facilitate easy disconnection from the connecting element.

According to specific embodiments of the invention, the base unit may comprise at least one mechanical actuator configured to provide movement through the connecting element.

According to specific embodiments of the invention, the base unit may comprise a control means configured to adapt a brushing cycle based on at least one of type of the cleaning head, identification of a user, a personalized program, a brushing profile of a user, or a combination thereof.

According to specific embodiments of the invention, the identification means of the connecting element may cooperate with the control means of the base unit to identify the user and trigger a brushing cycle specific to the user.

According to specific embodiments of the invention, the base unit may comprise a connection assembly configured to interact with the connecting element to circulate fluid between the base unit and the cleaning head.

According to specific embodiments of the invention, the base unit may comprise at least one soft valve configured to open when the connecting element is plugged onto the base unit.

According to specific embodiments of the invention, the base unit may comprise a physical barrier, a valve or a combination thereof, to prevent cross-contamination while plugging of the connecting element to the base unit or unplugging of the connecting element from the base unit.

It is yet another object of the invention to provide a cleaning head for use in an oral care appliance, the cleaning head comprising a connection interface configured to engage operatively with a connecting element to form a connection, wherein the connection interface comprises means to limit connection capability of said cleaning head in relation to certain compatible connecting elements and/or to increase strength of the connection.

According to specific embodiments of the invention, the cleaning head may comprise at least one of a mouthpiece, a bristle assembly or a combination thereof.

According to specific embodiments of the invention, the means of the connection interface of the cleaning head may include a coupling arrangement, wherein said coupling arrangement comprises a neck.

According to specific embodiments of the invention, the coupling arrangement of the cleaning head may include a mechanical arrangement, an electronic arrangement or a combination thereof.

According to specific embodiments of the invention, the coupling arrangement of the cleaning head may ensure a sealed connection of the cleaning head with the connecting element.

According to specific embodiments of the invention, the mechanical arrangement of the cleaning head may comprise a plurality of apertures.

According to specific embodiments of the invention, the mechanical arrangement of the cleaning head may be defined according to at least one of shape, depth, diameter, position or a combination thereof, of the plurality of apertures.

According to specific embodiments of the invention, at least a portion of the cleaning head may be configured to vibrate or rotate.

According to specific embodiments of the invention, material of the connection interface of the cleaning head may be selected to increase strength of the connection between the cleaning head and the connecting element.

According to specific embodiments of the invention, the cleaning head may comprise a flexible membrane having a plurality of cleaning tips.

According to specific embodiments of the invention, the cleaning head may be configured to deform in response to pressure variations inside a cavity formed by at least a portion of the flexible membrane.

According to specific embodiments the invention, the flexible membrane may be configured to cooperate with at least a portion of the connecting element to form at least one inflatable pocket.

Various objects, features, aspects and advantages of the present disclosure will become more apparent from the following detailed description of preferred embodiments, along with the accompanying drawing figures in which like numerals represent like features.

DETAILED DESCRIPTION

Aspects of the present invention can be understood by reference to the figures and description set forth herein. However, the following descriptions, and numerous specific details thereof, are given by way of illustration and not of limitation. Many changes and modifications to the specific descriptions may be made without departing from the spirit and scope thereof, and the present invention includes all such modifications. It is to be understood that the disclosed embodiments may or may not overlap with each other. Thus, part of one embodiment, or specific embodiments thereof, may or may not fall within the ambit of another, or specific embodiments thereof, and vice versa.

Aspects of specific embodiments of this invention will be presented using specific examples and will be represented in different figures. For clarity and ease of description, each aspect includes only a few embodiments. Different embodiments from different aspects may be combined or practiced separately, to design a customized process depending upon application requirements. Many different combinations and sub-combinations of a few representative processes shown within the broad framework of this invention, that may be apparent to those skilled in the art but not explicitly shown or described, should not be construed as precluded.

Figure 1:
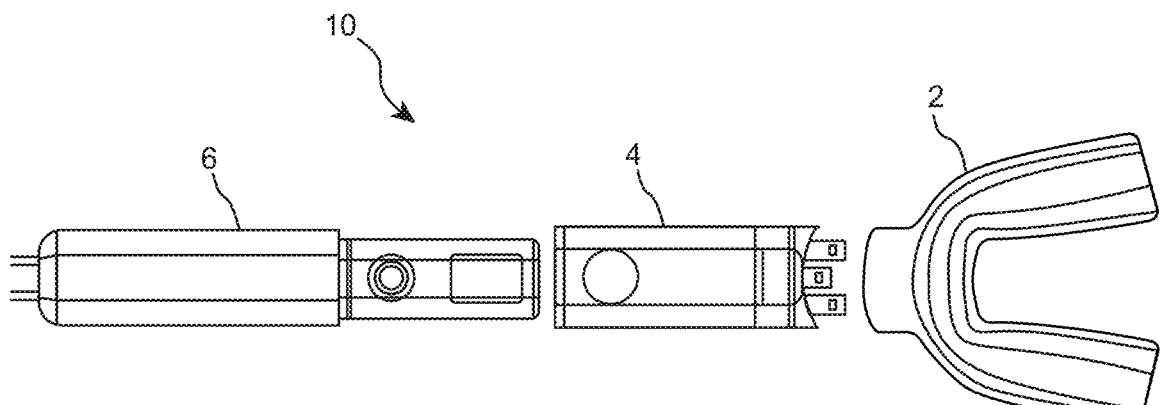
FIG. 1 illustrates an oral care appliance 10 in accordance with specific embodiments of the present invention.

According to an embodiment of the invention as shown in FIG. 1, an oral care appliance 10 comprises a cleaning head 2, a connecting element 4 and a base unit 6. The cleaning head 2, the connecting element 4 and the base unit 6 are configured to arrange/couple in a manner that the connecting element 4 is engaged operatively with the cleaning head 2 to form a first connection and the connecting element 4 is engaged operatively with the base unit 6 to form a second connection.

Figure 2A:
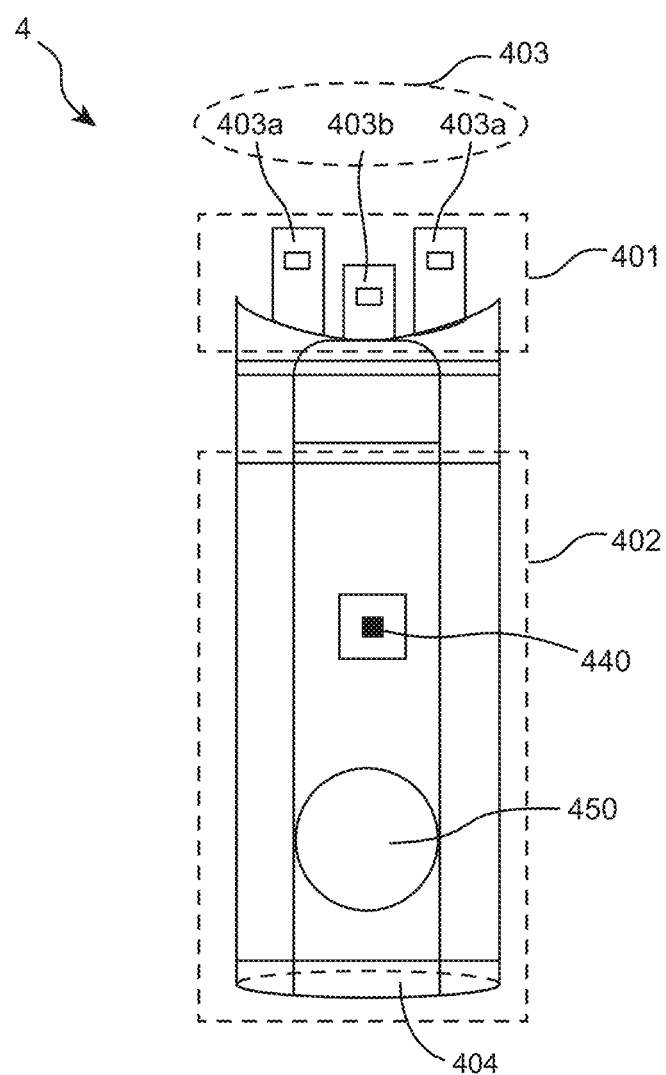
FIG. 2A illustrates a connecting element 4 in accordance with specific embodiments of the present invention.
Figure 2B:
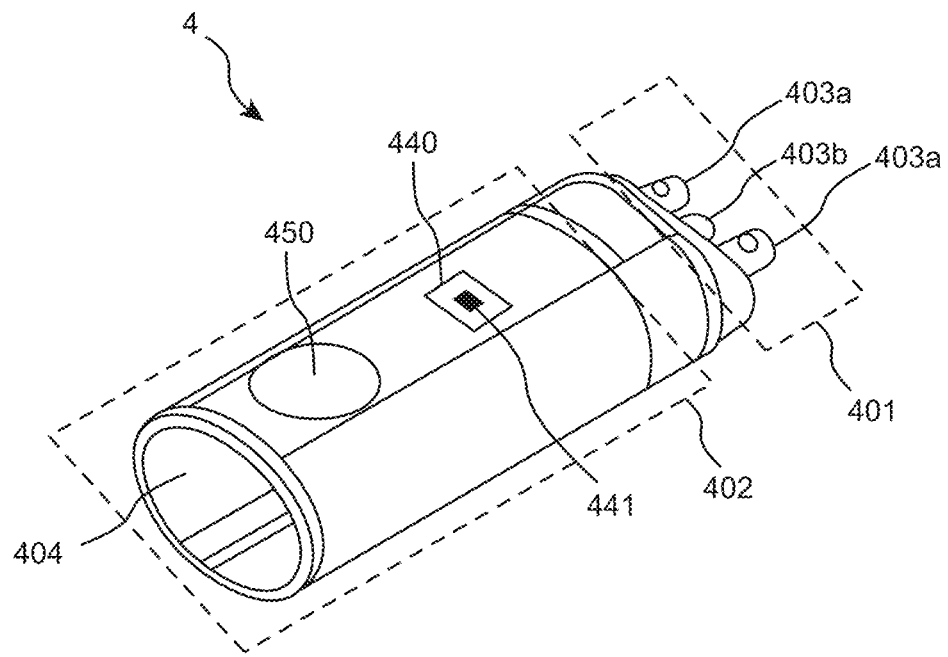
FIG. 2B illustrates the perspective view of a connecting element 4 in accordance with specific embodiments of the present invention.
Figure 2C:
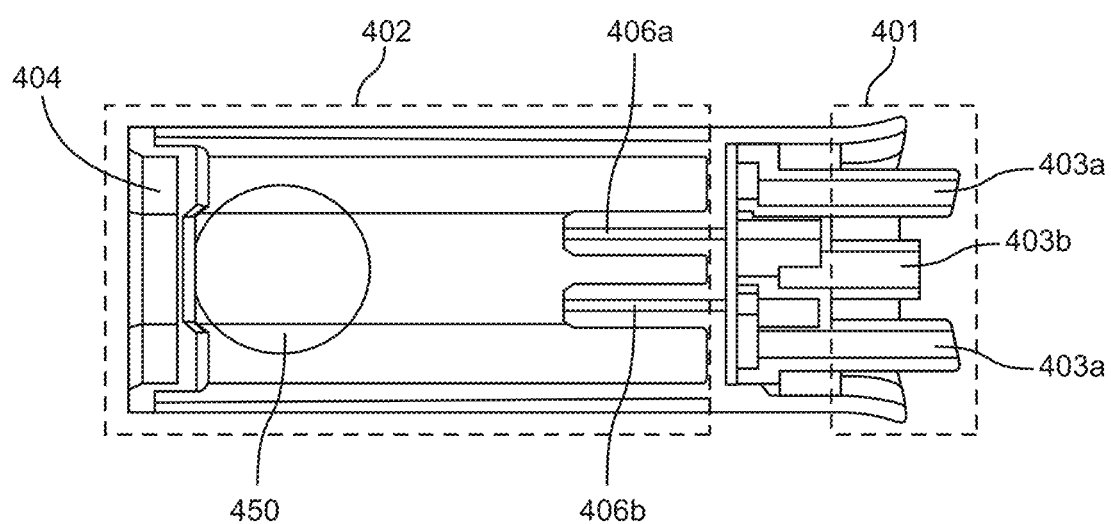
FIG. 2C illustrates a connecting element 4 in accordance with specific embodiments of the present invention.

According to another embodiment of the invention shown in FIG. 2A-2C, a connecting element 4 comprises a first connection interface 401 configured to engage operatively with the cleaning head 2 to form the first connection. The connecting element 4 further comprises a second connection interface 402 configured to engage operatively with the base unit 6 to form the second connection. The first connection interface 401 and/or the second connection interface 402 of the connecting element 4 comprise(s) means 403 to make the first connection stronger than the second connection and/or to limit the connection capability of the connecting element 4 in relation to certain compatible cleaning heads 2. The means 403 are configured to ensure strong connection and/or compatibility with the cleaning head 2. The connecting element 4 further comprises an identification means 440 to allow identification of a user of the oral care appliance.

The means 403 according to another embodiment of the invention include a coupling arrangement, wherein the coupling arrangement includes a mechanical arrangement, an electronic arrangement or a combination thereof. In a specific example, the mechanical arrangement further comprises a plurality of protruding members 403a and 403b configured to engage with corresponding arrangement comprising a plurality of apertures on the connection interface of the cleaning head 2. Examples of the protruding members include, but are not limited to, pipe(s), pin(s), clip(s), lug(s), tube(s), magnetic pin(s), snap(s), button(s), fastener(s) or a combination thereof. Furthermore, the mechanical arrangement can be defined according to at least one of shape, length, diameter, position, or a combination thereof, of the plurality of protruding members 403a and 403b. In another specific example, the electronic arrangement comprises at least one electric contact or electronic pin. In some embodiments, the electronic arrangement comprises an NFC tag, a barcode, quick response (QR) code or a combination thereof.

According to another embodiment of the invention, the means 403 include a coupling arrangement comprising a mechanical arrangement. For example, the mechanical arrangement can be a specific keying and/or a locking arrangement on the first connection interface 401 and/or the second connection interface 402 of the connecting element 4, wherein the mechanical arrangement enables the first connection interface 401 and/or the second connection interface 402 to engage with a corresponding/complementary arrangement on connection interface(s) of the cleaning head 2 and/or the base unit 6. Furthermore, the coupling arrangement is configured to make the first connection stronger than the second connection and/or to limit the connection capability of the connecting element 4 in relation to certain compatible cleaning heads 2. In a specific example, the mechanical arrangement comprises a specific keying arrangement on the first connection interface 401 configured to engage with a corresponding locking arrangement on a connection interface of the cleaning head 2 to ensure sealing of the first connection. In another specific example, the mechanical arrangement comprises a specific locking arrangement on the first connection interface 401 configured to engage with a corresponding keying arrangement on a connection interface of the cleaning head 2 to ensure sealing of the first connection. Similarly, the coupling arrangement further comprises a specific locking and/or keying arrangement on the second connection interface 402 to engage with corresponding/complementary arrangement on a connection interface of the base unit 6 to ensure sealing of the second connection.

According to another embodiment of the invention, the connection between the base unit 6 and the connecting element 4 (i.e. the second connection) and the connection between the connecting element 4 and the cleaning head 2 (i.e. the first connection) are arranged in such a way that it is easier to remove the connecting element 4 from the base unit 6 than removing the cleaning head 2 from the connecting element 4, thereby providing an ease of removability when different users want to use the oral care appliance. This ease of removability/disconnection is achieved due to the first connection being stronger than the second connection. For example, the first connection can be formed by a mechanical arrangement having interlocking keying while the second connections is formed by a mechanical arrangement exhibiting friction or an electronic arrangement exhibiting a magnetic connection. As another example, the first connection can only be released with a reasonable amount of force when that force is accompanied by a specialized unlocking action such as the press of a button, twisting of a particular element, rotation of an annular slider arrangement, etc. while the second connection can be released with that reasonable amount of force alone.

The differing strengths of connection mentioned in the prior paragraph offer an advantage that different users or members of the same family can connect their respective/individual connecting elements 4 to the same base unit 6 at different points in time and remove their respective/individual connecting elements 4 from the base unit 6 after the use in order to share the same base unit 6 with multiple users. Moreover, it is also convenient and useful to preserve the connecting element 4 since the identification means 440 is configured to identify the user. Preserving the connecting element can therefore avoid the need for a user to re-register a respective/individual cleaning head 2 every time it is replaced.

According to another embodiment of the invention, the material of the first connection interface 401 and/or the second connection interface 402 may be selected to make the first connection stronger than the second connection. Further, the material of the first connection interface 401 may be selected to create high friction between the first connection interface 401 and corresponding connection interface of the cleaning head 2, whereas the material of the second connection interface 402 may be selected to create low friction between the second connection interface 402 and corresponding connection interface of the base unit 6. Moreover, the first connection interface 401 and corresponding connection interface of the cleaning head 2 can be made up of same or different materials suitable to create high friction between them in order to make the first connection stronger than the second connection. On the other hand, the second connection interface 402 and corresponding connection interface of the base unit 6 can be made up of the same or different materials suitable to create low friction between them in order to make the second connection weaker in comparison to the first connection. In a specific example, such materials can be ABS for the first connection interface 401 and TPE for the corresponding connection interface of the cleaning head 2. In another specific example, silicone can be used for both the first connection interface 401 and the corresponding connection interface of the cleaning head 2. In another specific example, suitable hard materials can be used for the first connection interface 401 and suitable soft materials can be used for the corresponding connection interface of the cleaning head 2. In another specific example, a polymeric material (such as ABS or nylon high density polyethylene) is used for the second connection interface 402 and corresponding connection interface of the base unit 6. In another specific example, any suitable hard material known to a person skilled in the art can be used for both the second connection interface 402 and corresponding connection interface of the base unit 6.

ABS is a thermoplastic copolymer, impact resistant, tough, and with a reasonable heat resistance. ABS is chemically resistant to acids, alkalis and alcohols. ABS is lightweight and injection moldable. All these properties make it suitable as a material for the second connection interface 402.

According to another embodiment of the invention, the first connection interface 401 and the second connection interface 402 are shaped so that there is a difference between functional clearance of the first connection and the second connection, thereby making the first connection stronger than the second connection and creating difference of gripping between the two connections. This can be achieved by using two different functional clearances. The functional clearance between the second connection interface 402 and corresponding connection interface of the base unit 6 can be positive and still ensure a good sealing between the connecting element 4 and the base unit 6, whereas the functional clearance between the first connection interface 401 and corresponding connection interface of the cleaning head 2 can be smaller or even negative.

According to another embodiment of the invention, the connecting element 4 is detachable from the cleaning head 2 by performing a first specific action and the connecting element 4 is detachable from the base unit 6 by performing a second specific action. Therefore, it can be easier to remove the connecting element 4 from the base unit 6 than removing the cleaning head 2 from the connecting element 4. In one example, the first specific action and the second specific action are achieved by one or more of partial of rotation, push or pull operations. In another specific example, the connecting element 4 is detachable from the base unit 6 by performing the second specific action comprising of simple pull operation while it is also possible to perform the first specific action to separate the connecting element 4 from the cleaning head 2. The first specific action can be pushing a small clip, rotating (fully or partially) the parts, pushing the two parts toward each other (with a push-to-release mechanism), sliding them apart on any axes, etc.

According to another embodiment of the invention, the means 403 are configured to limit the connection capability of the connecting element 4 in relation to certain compatible cleaning heads. This can prevent the user from plugging in a non-compatible cleaning head that would damage the base unit 6 or would simply not work correctly. Furthermore, the means 403 include the coupling arrangement configured to ensure compatibility with certain cleaning heads only.

According to another embodiment of the invention, the connecting element 4 is configured to interact with at least one mechanical actuator of the base unit 6 to provide movement (for example, rotations or vibrations) to at least a portion of the cleaning head 2, thereby resulting in a cleaning action on the teeth of the user. Further, at least a portion of the connecting element 4 can be made up of a hard/rigid material to transmit the vibrations generated by the mechanical actuator to at least the portion of the cleaning head 2.

According to another embodiment as shown in FIG. 2A, the plurality of protruding members 403a, 403b are configured to engage with corresponding members/apertures on the cleaning head 2 to form the first connection. The plurality of protruding members 403a and 403b can be used for injection/aspiration of a fluid through the connecting element 4. In one example, the protruding member(s) 403a can be used for direct injection/supply of fluid/cleaning agent through the connecting element 4 to the cleaning head 2 and the protruding member(s) 403b can be used for creation of vacuum in the cleaning head 2 and/or the aspiration of waste through the connecting element 4. In another specific example, the plurality of protruding members 403a and 403b are pipes with a cross-sectional internal diameter and external diameter. The internal diameter and external diameter can be the same or may vary among the plurality of the pipes 403a and 403b. In another specific example, pipes 403a used to inject the cleaning agent have a smaller inner diameter than the pipe(s) 403b which are configured to create vacuum in the cleaning head 2 and/or aspirate waste through the connecting element 4. The purpose of this arrangement is to achieve vacuum in the cleaning head 2 in a short time and/or to easily remove the waste including plaque, food particles, debris, and fluid/cleaning agent without any blockage in the pipes 403b. Also, the limitation of small diameter of the pipes 403a can be overcome as there can be more than one injection pipes 403a to obtain an equal/uniform distribution of the cleaning agent in the mouth of the user. Furthermore, the cleaning agent/fluid to be passed through has pre-decided consistency and/or concentration to reduce the chances of blocking pipes and to achieve the compact structure of the oral care appliance 10 as well as individual parts.

According to another embodiment of the invention as shown in FIG. 2B, the means 403 comprise at least an aperture 404 configured to couple/engage with the base unit 6. The aperture 404 is a hollow section formed in the connecting element 4 configured to receive at least a portion of the base unit 6 and form the second connection. The aperture 404 can be of a specific shape and diameter and, thus, provide a keying corresponding to the portion of the base unit 6.

In a specific embodiment, the aperture 404 is of a shape of an oval, with its long dimension between 15 mm and 20 mm and its short dimension between 10 mm and 14 mm.

According to another exemplary embodiment as shown in FIG. 2C, the aperture 404 of the connecting element 4 comprises a plurality of members 406a and 406b configured to engage with the corresponding members of the base unit 6. The plurality of members 406a and 406b are shaped to open or pierce at least a soft valve in the base unit 6 when the connecting element 4 is plugged onto the base unit 6. For example, the plurality of members 406a and 406b comprise tubes or pipes configured to open or pierce soft silicone (or any other polymer material) valves when the connecting element 4 is plugged onto the base unit 6. These soft valves allow good flow circulation when the connecting element is plugged. When the connecting element 4 is being unplugged, these soft valves come back to their original closed position. These soft valves prevent any dirt, backflow, or any other undesirable elements from penetrating the base 6 when the connecting element 4 is unplugged from the base 6.

According to another embodiment of the invention, the connecting element 4 of the oral care appliance 10 comprises an identification means 440 configured to allow collection of identification data on different aspects related to the oral care appliance 10. The identification means 440 further comprises a communication module, a scannable code, a mechanical arrangement, an electronic arrangement or a combination thereof. The communication module further comprises at least one of an NFC module, a Bluetooth module, a WiFi module, or a combination thereof. In a specific example, the mechanical arrangement can be based on locking and/or keying arrangement. In another specific example, the electronic arrangement may comprise at least one electronic pin or electric contact configured to cooperate with corresponding electronic pin or electric contact on the base unit 6 and complete a circuit. When the connecting element 4 is plugged onto the base unit 6, a sensor or a detecting module located in the base unit 6 or the connecting element 4 triggers the communication module to communicate with a control means of the base unit 6 and send/receive signal(s), thereby identifying the user as well as recognizing the connecting element 4 and the cleaning head 2 specific to the user. Further, the electronic arrangement and/or sensor may facilitate identification of the user in cooperation with other parts of the identification means 440.

According to another embodiment of the invention, the identification means 440 allows the base unit 6 to recognize the connecting element 4 and/or the cleaning head 2 specific to the identified user. This recognition allows data collection on different aspects such as, but not limited to, change of user, launch of a brushing cycle, state of the cleaning head (if it needs to be replaced or not), number of pulsations/vibrations chosen by the user, type of fluid/cleaning agent, amount/volume of fluid/cleaning agent, type of cleaning head, duration of brushing cycle, etc. Further, the identification means 440 can be located on any appropriate position in/on the connecting element 4 to cooperate with a control means of the base unit 6.

In another exemplary embodiment, the communication module of the identification means 440 comprises an NFC module/tag 441 that can be connected or brought in proximity to the corresponding NFC module/reader to identify the user and allow transmission of the information related to the last brushing event performed by the user, for example, day, date, brushing time, brushing pattern used, elapsed time since last brushing, or the like. Additionally, the transmitted information may include identification of the user (i.e. user identifier), usage information, or any other information related to a brushing profile of the user. This information can comprise basic details such as name, age and sex of the user, and specific details related to the usage of the oral care appliance 10 such as recommended brushing time (e.g., 2 minutes per brushing cycle), cleaning agent/fluid, recommended brushing pressure or location, a personalized program associated with the user, medical/dental records of the user, predefined brushing cycles or the like. The corresponding NFC reader can be embedded in or attached to any component of the oral care appliance 10 such as, but not limited to, any portion of the base unit 6. Further, an automatic connection can be established simply by bringing the two parts having the NFC tag 441 and the NFC reader within the range of each other. In another embodiment of the invention, the communication module can also be configured to communicate in a bidirectional manner with other external communication entities such as smartphones.

In some embodiments, the identification means of the connecting element 4 may include a scannable code such as barcode or quick response (QR) code which may be read by a corresponding reader/scanner present in other components of the oral care appliance 10 or any other external devices. The scannable code may include specific information necessary to identify the user.

According to another embodiment of the invention, the connecting element 4 may also comprise at least one valve. In one embodiment, the liquid flowing through the protruding member 403a is clean, and the liquid flowing through the protruding member 403b is contaminated. In one example, the at least one valve is a check valve present in the plurality of protruding members 403a and 403b of the first connection interface 401. These check valves are configured to prevent the back flow of the fluid flowing through the connecting element 4. Any other arrangement of the check valves in the plurality of protruding members 403a-404 of the connecting element 4 will be apparent to those skilled in the art.

According to another embodiment of the invention, the connecting element 4 may also comprise an orifice 450 to receive and access a power button present on at least a portion of the base unit 6 to switch on or off the oral care appliance 10 or any other interface assembly.

According to another embodiment of the invention, the connecting element 4 comprises at least one inflatable pocket that is configured to inflate or deflate when the inflatable pocket is filled with a fluid (for example, air or water). In another exemplary embodiment, the first connection interface 401 is configured to cooperate with a flexible membrane of the cleaning head 2 to form at least one inflatable pocket that is configured to inflate or deflate when the inflatable pocket is filled with a fluid (for example, air or water).

According to another embodiment of the invention, the connecting element 4 is configured to interact with a connection assembly of the base unit 6 to circulate fluid between the base unit 6 and the cleaning head 2.

Figure 3A:
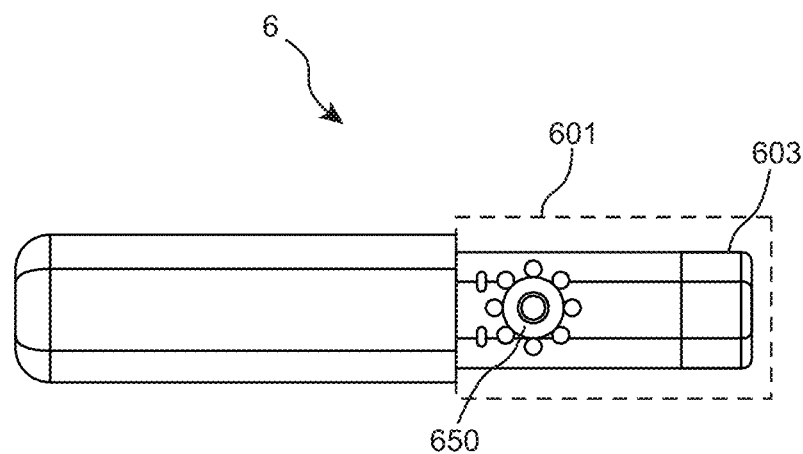
FIG. 3A illustrates a base unit 6 in accordance with specific embodiments of the present invention.
Figure 3B:
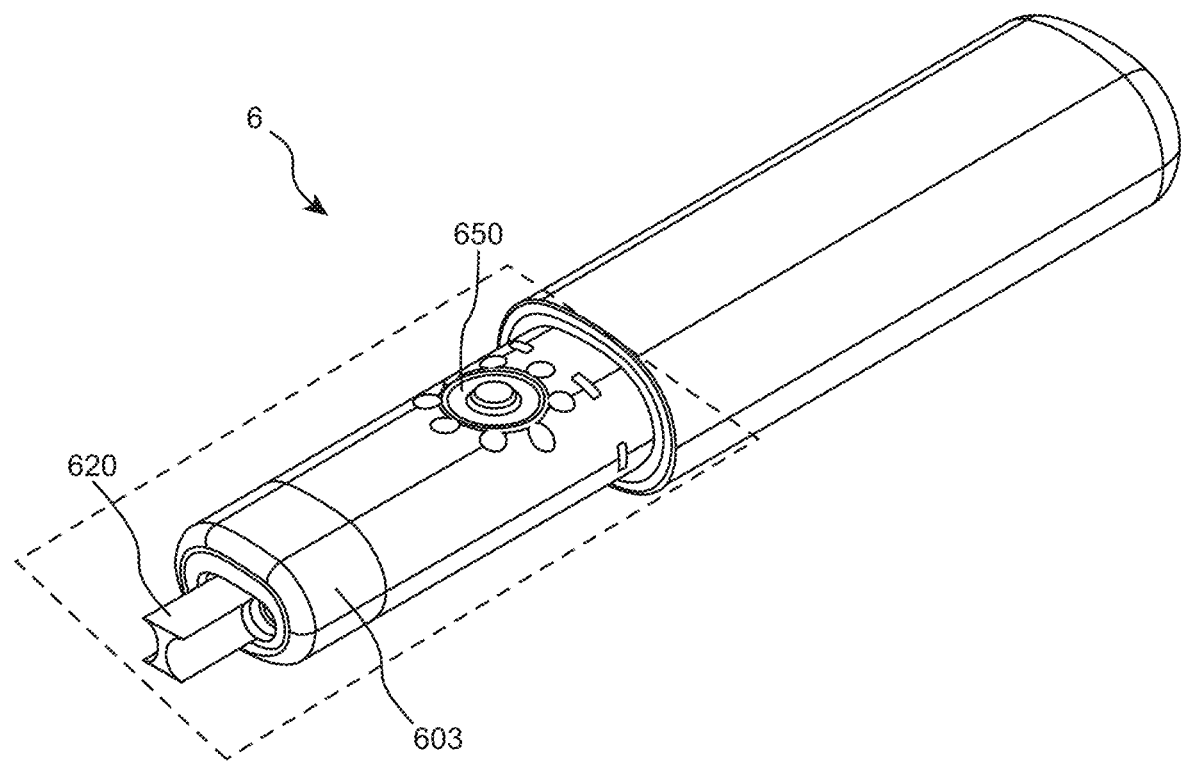
FIG. 3B illustrates a perspective view of a base unit 6 in accordance with specific embodiments of the present invention.
Figure 3C:
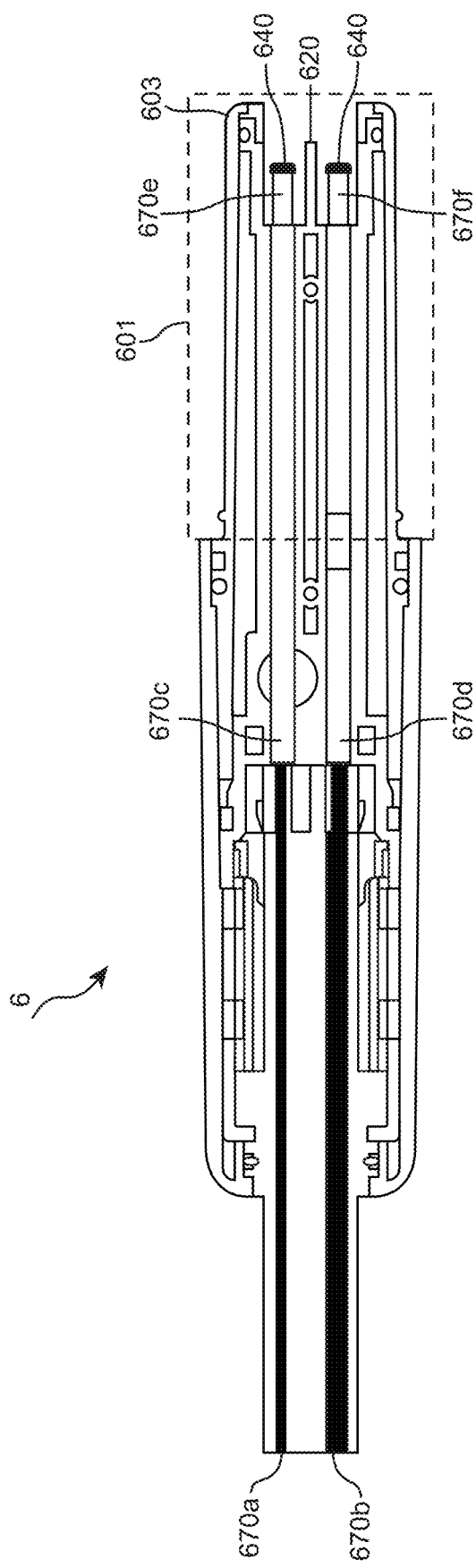
FIG. 3C illustrates the structure of a base unit 6 in accordance with specific embodiments of the present invention.

According to another embodiment of the invention, as shown in FIG. 3A-3C, a base unit 6 comprises a connection interface 601 configured to engage operatively with the connecting element 4 to form a connection, wherein the connection interface 601 comprises means 603 to facilitate disconnection of the connection and/or to limit the connection capability of said base unit 6 in relation to certain compatible connecting elements. The means 603 are configured to ensure sealed connection and/or compatibility with the connecting element 4.

The means 603 of the base unit 6 according to another embodiment of the invention can include a coupling arrangement comprising a mechanical arrangement, an electronic arrangement or a combination thereof. In a specific example, the mechanical arrangement further comprises at least one protruding member configured to engage with a corresponding arrangement on a connection interface of the connecting element 4. Examples of protruding members include, but are not limited to, pipe(s), pin(s), clip(s), lug(s), tube(s), magnetic pin(s), snap(s), button(s), fastener(s) or a combination thereof. In another specific example, the mechanical arrangement comprises specific keying and/or locking arrangement on the connection interface 601 and corresponding connection interface of the connecting element 4, wherein the mechanical arrangement enables the connection interface 601 to engage with corresponding/complementary arrangement on a connection interface of the connecting element 4. Furthermore, the coupling arrangement is configured to facilitate disconnection of the connection and/or to limit the connection capability of said base unit 6 in relation to certain compatible connecting elements 4. In another specific example, the electronic arrangement comprises at least one electric contact or electronic pin.

According to another embodiment of the invention, the material of the connection interface 601 is selected to facilitate disconnection of the connection between the base unit 6 and the connecting element 4. In one specific example, a polymeric material (e.g. ABS or nylon) can be used for connection interface 601. The material of the connection interface 601 can be selected from, but is not limited to, hard material, polymeric material, any material that creates less friction between the connection interface 601 and corresponding connection interface of the connecting element 4, still making a sealed connection and facilitating easy disconnection whenever required. Furthermore, this offers an advantage that different users or members of the same family can connect their respective/individual connecting elements 4 to the same base unit 6 at different points in time and remove their respective/individual connecting elements 4 from the base unit 6 after the use in order to share the same base unit 6 with multiple users.

According to another embodiment of the invention, the functional clearance between the connection interface 601 and corresponding connection interface of the connecting element 4 can be positive and still ensure a good sealing between the connecting element 4 and the base unit 6. This positive functional clearance ensures a sealed connection and also provide an ease in removability/disconnection of the base unit from the connecting element 4.

According to another embodiment of the invention, the base unit 6 comprises at least one mechanical actuator configured to provide motion/movement to at least a portion of the cleaning head 2 through the connecting element 4. In one specific example, the at least one mechanical actuator generates movements (for example, vibrations or rotations) with the help of, but not limited to, an oscillating part, a rotating part, translating part or any other vibrating source known in the art. These movements are transmitted to other part(s) of the oral care appliance 10 through the connecting element 4. In another specific example, the at least one mechanical actuator is configured to provide rotational motion to the cleaning head 2 through the connecting element 4. In another specific example, the at least one mechanical actuator can be a pump.

According to another embodiment of the invention, the base unit 6 comprises a control means configured to adapt a brushing cycle based on at least one of type of cleaning head 2, identification of a user, a personalized program, a brushing profile of a user, or a combination thereof. The control means comprises at least one of a microprocessor, a microcontroller, a memory module, a communication module, a user interface module, a display module, a timer, a counter, a monitoring means, a clock, a user identification module, or a combination thereof. The monitoring means may further comprise a sensor(s) configured to monitor values of one or more of the following, but not limited to, performance indicator(s) of the oral care appliance 10, pressure, amount/volume, temperature, pH value, flow etc. In a specific example, the pressure difference between the components of the oral care appliance 10 is monitored. In another specific example, the amount/volume of the cleaning agent being injected into the cleaning head 2 is monitored. Therefore, the control means can be configured to monitor one or more operational characteristics of the brushing cycle, wherein the operational characteristics of the brushing cycle can be selected from, but not limited to, pressure, volume, flow of the fluid/cleaning agent, duration of pulsations/vibrations, movements related to the cleaning head and user input.

According to another embodiment of the invention, the control means is configured to identify the user in cooperation with the identification means 440 of the connecting element 4. The control means communicates with the identification means 440 to identify the user and collect data specific for the user such as, but not limited to, change of user, launch of a brushing cycle, state of the cleaning head (if it needs to be replaced or not), number of pulsations/ vibrations chosen by the user, type of fluid/cleaning agent, amount/volume of fluid/cleaning agent, type of cleaning head, duration of brushing cycle, etc. User identification may be performed by a software or a combination of the software and hardware component(s) of the oral care appliance 10.

In another exemplary embodiment, a smartphone application can be used to send a command to the oral care appliance 10 and adapt the brushing cycle by communicating with the control means and/or the identification means 440 accordingly.

According to another embodiment of the invention, the control means is configured to measure the time elapsed since a last brushing event performed by the user and adapt the brushing cycle accordingly.

According to another embodiment of the invention, the control means is configured to store at least a brushing profile of the user in the memory module, wherein the brushing profile comprises at least one of the time elapsed since a last brushing event performed by the user, a specific information of the user, a record of previous brushing events performed by the user, or a combination thereof. The brushing profile of the user comprises information corresponding to one or more of the following parameters: the user's physical characteristics, the user's medical/dental record, the user's saliva analysis results, a log of pressure readings inside the user's mouth and a profile of the user, or a combination thereof. In a specific example, the oral care appliance may launch a softer brushing cycle and adapt the brushing cycle accordingly if the user is a child. In another specific example, the pressure inside the user's mouth is recorded so as to adapt the brushing cycle if the pressure does not reach the threshold value due to the mouth shape of the user or any other physical characteristic(s) of the user. In a specific example, the oral care appliance 10 performs saliva analysis while in operation. The control means identifies the user in cooperation with the identification means 440 and stores the information in the memory module. This allows the control means to perform oral health diagnostic or allows a healthcare professional or any third party to perform a diagnostic, provide counsel, adapt the brushing cycle accordingly, etc.

According to another embodiment of the invention as shown in FIG. 3C, the base unit 6 comprises a connection assembly wherein the connection assembly is configured to interact with the connecting element 4 to circulate fluid between the base unit 6 and the cleaning head 2. The connection assembly comprises at least one of a plurality of pipes, 670a, 670b, 670c and 670d, a plurality of hollow connectors, 670e and 670f, at least one valve, or a combination thereof. The connection assembly may further comprise at least one supply tank to supply the cleaning agent and at least one waste tank to extract/receive the fluid/waste. The connection assembly may further comprise at least one mechanical actuator operatively engaged to the connection assembly to generate a flow of the cleaning agent into the cleaning head 2. The plurality of pipes 670a, 670b, 670c, 670d and the plurality of hollow connectors 670e and 670f can be used for injection/aspiration of fluid/cleaning agent from/to the base unit 6. In a specific example, the pipes 670a, 670c and the connector 670e (injection connector) are configured to supply/inject the cleaning agent to the cleaning head 2 through the connecting element 4 while the pipes 670b, 670d and the connector 670f (vacuum connector) are configured to aspirate waste/fluid from the cleaning head 2 and/or create vacuum in the cleaning head 2 through the connecting element 4. The length, shape and diameter of the plurality of pipes 670a, 670b, 670c, 670d and the plurality of hollow connectors can be the same or different. In another specific example, the length of the connector 670f (vacuum connector) is shorter than the length of the connector 670e (injection connector). The purpose of making this arrangement is to prevent the risk of cross-contamination to other users after disconnection of the base unit 6 from the connecting element 4.

According to another embodiment of the invention as shown in FIGS. 3B and 3C, the base unit 6 comprises a physical barrier, a valve or a combination thereof, to prevent cross-contamination while plugging of the connecting element 4 to the base unit 6 or unplugging of the connecting element 4 from the base unit 6. Indeed, it is useful to prevent cross contamination when another user uses the device. In one example, the physical barrier is a wall 620 positioned between the connector 670e for the injection of the fluid/cleaning agent and the connector 670f for aspiration/vacuum of the fluid/waste from the base unit 6. The wall 620 creates a barrier to prevent the cross contamination in case of any spillage or leakage of the fluid in the base unit 6 during the plugging/unplugging of the connecting element 4 from the base unit 6. In one example, the wall 620 may overhang from the base unit 6 to completely separate the connector 670e and 670f as shown in FIG. 3B.

According to another embodiment of the invention shown in FIG. 3C, the base unit 6 comprises at least one soft valve 640. The soft valve can be, but is not limited to, a silicon valve, a polymers valve or any other soft valve known to the person skilled in the art. The soft valve 640 is configured to be opened/pierced while making a connection with corresponding members of the connecting element 4. When the connecting element 4 is being unplugged from the base unit 6, the soft valves 640 come back to the original position on the edges of the connectors 670e and 670f, thus closing them to limit the risk of cross-contamination. In another specific embodiment, the soft valve 640 is configured to be opened when a certain pressure difference between the pipes 670e and 670f and the pressure applied on the other side of the soft valve 640 is reached. This pressure difference can be generated by a pump arrangement in the base unit 6.

According to another embodiment of the invention, the base unit 6 comprises a power button 650 to switch on or off the oral care appliance 10. When the base unit 6 is connected to the connecting element 4, the power button 650 is received by the corresponding orifice present on the connecting element 4. Alternatively, the power button 650 can also be provided on other components of the oral care appliance 10 such as, but not limited to, the connecting element 4, a charging station, the display module of the base unit 6 or the base unit 6 itself.

Figure 4:
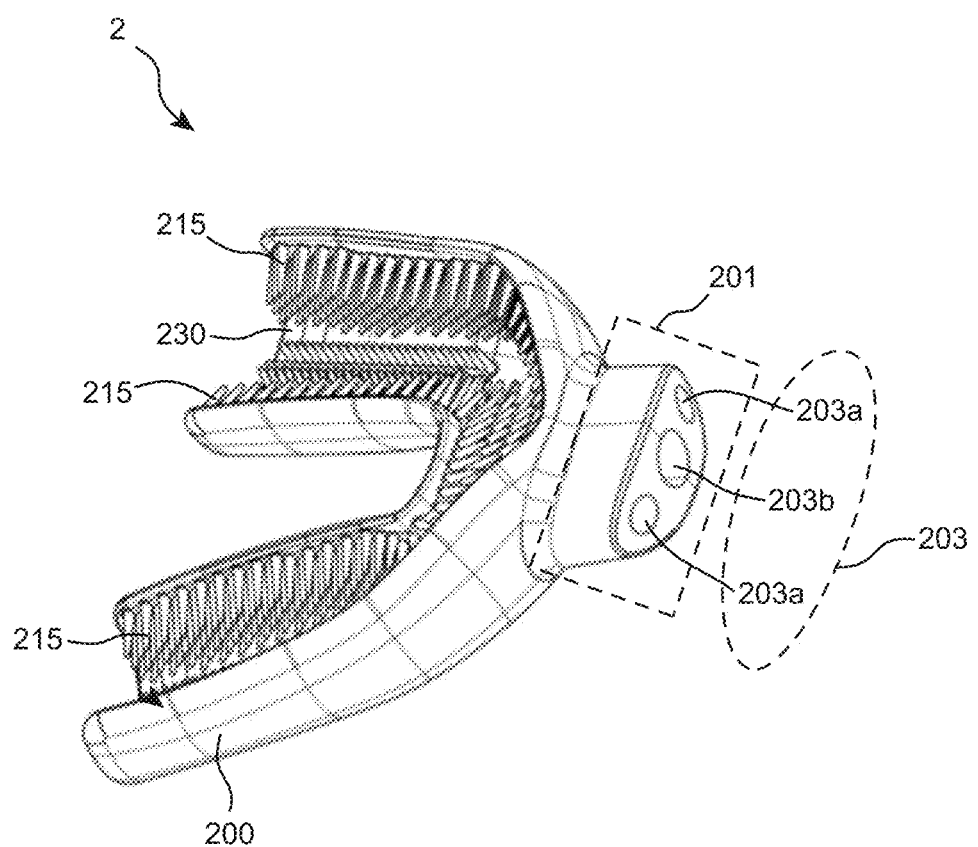
FIG. 4 illustrates a perspective view of a cleaning head 2 in accordance with specific embodiments of the present invention.

According to another embodiment of the invention, as shown in FIG. 4, a cleaning head 2 comprises a connection interface 201 configured to engage operatively with a connecting element 4 to form a connection. Additionally, the connection interface 201 comprises means 203 to limit the connection capability of the cleaning head 2 in relation to certain compatible connecting elements 4 and/or to increase strength of the connection between the cleaning head 2 and the connecting element 4.

According to another embodiment, the cleaning head 2 comprises at least one of a mouthpiece, a bristle assembly or a combination thereof. The cleaning head as shown in FIG. 4 comprises a mouthpiece 200 that can be in a form of a denture or a U-shaped mouthpiece. The mouthpiece 200 may be made-up of soft material which is molded/pre-shaped in a curved shape forming an arch, U-shape, c-shape, horseshoe shape, or any other shape allowing easy insertion of the mouthpiece 200 around the dental arch of the user. In another embodiment of the invention, the mouthpiece 200 can be of any other shape compatible to provide cleaning action on the dental arch of the user.

The mouthpiece 200 further comprises a flexible membrane 230 configured to deform in order to perform cleaning/oral care action in the user's mouth. The mouthpiece 200 is preferably made up of flexible/soft material suitable for medical use. This allows easy insertion inside the mouth of the user and reversible deformation. The mouthpiece 200 can be made up of flexible material impermeable to gases (such as air), liquids (water, cleaning liquid, disinfecting liquid) and any solid (waste particles, debris); such as latex or silicone compatible with a medical or oral care use. In one example, the mouthpiece 200 is configured to have a rigid structure made up of a hard material to hold on the structure while providing cleaning action on the dental arch. The components of the mouthpiece 200 can be composed of one or more several materials. Examples of materials may include but are not limited to, rubber, plastic, silicon, latex, TPE, polymer and other soft and flexible materials suitable for oral care.

Thermoplastic elastomers (TPE) are suitable as flexible materials for oral care applications. They are copolymers consisting of a physical mix of polymers having plastic and elastomeric properties. Furthermore, they have a suitable temperature range of operation, between −10° C. and 80° C. They can have good food and medical grade properties as well as an absence of significant creep. Furthermore, they have good tearing and tensile strength. This makes TPEs suitable for constituting the flexible material of the mouthpiece 200.

Silicone is another polymer suitable as flexible material for oral care applications. It is a very stable polymer with low chemical reactivity. Furthermore, it is stable over a large range of temperature (between −100° C. and 250° C.). It also has excellent creep, tear strength and elongation properties. In addition, it also has good food and medical grade properties making it suitable for the flexible material of the mouthpiece 200.

For pleasing of the eyes, the inner and outer surface of the mouthpiece can be colored or transparent with visual effect or not, textured or not.

In a particular embodiment, the mouthpiece comprises two membranes. The outer membrane is made of rigid material to drive the deformation of the inner membrane toward the teeth. In another embodiment, the shape of the outer membrane is designed to favor the amplitude and gripping pressure of the deformation of the inner membrane toward particular areas of the dentition to improve their cleaning. This particular feature can be achieved by having discontinuity of the volume of the cavity or cavities, the thickness, the material, rigidity or the shape of the outer membrane or any other of its characteristics.

According to another embodiment of the invention, the flexible membrane 230 comprises a plurality of cleaning tips 215 configured to reach out the dental arch of the user to provide the cleaning action while the oral care appliance 10 is in operation. The cleaning tips 215 can be selected from, but not limited to, bristles, brushes, fibers, nylon tufts or the like. The cleaning tips 215 can include a set of cylindrical or conical bristles which may be glued, overmolded or attached to the flexible membrane 230 by other different means. In specific examples, the shape of the cleaning tips 215 can be conical, cylindrical, flat, pointed tip, tapered, star-shaped, zig-zag etc. The cleaning tips 215 can be arranged in different angular arrangements in the mouthpiece 200 to provide effective cleaning around and in between the dental arch. The cleaning tips 215 can be used for removing plaque, debris, inter-dental particles etc. inside the mouth.

In some embodiment, the oral care action of the cleaning elements can consist of a mechanical action such as rubbing, sliding, deforming, rotating, vibrating or any other particular movement on the surface of the teeth of the user.

According to another embodiment of the invention, the cleaning head 2 (as illustrated in FIG. 4) is configured to deform in response to pressure variations inside a cavity, which is a closed or nearly closed space formed by at least a portion of the flexible membrane 230 and the dental arch of the user. The flexible membrane 230 can be configured to move/deform with respect to changes in the pressure inside the cavity.

According to another embodiment of the invention, the flexible membrane 230 is configured to cooperate with at least a portion of the connecting element 4 to form at least one inflatable pocket.

Figure 5A:
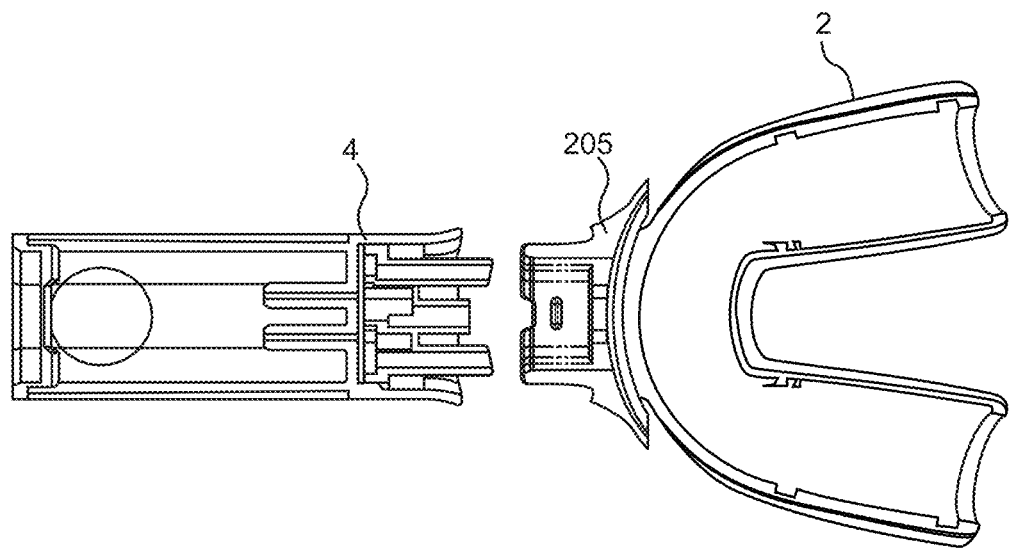
FIG. 5A illustrates a cleaning head 2 comprising a neck 205 in accordance with specific embodiments of the present invention.

According to another embodiment of the invention, as shown in FIG. 5A, the means 203 of cleaning head 2 include a coupling arrangement, wherein said coupling arrangement comprises a neck 205. The neck 205 is configured to provide a snug-fit connection between the cleaning head 2 and the connecting element 4. The neck is also configured and/or shaped to limit the connection capability of said cleaning head 2 in relation to certain compatible connecting elements. The snug fit connection increases strength of the connection and ensures that it is hard to remove the cleaning head 2 from the connecting element 4.

In another embodiment of the invention, the means 203 include the coupling arrangement, wherein the coupling arrangement includes a mechanical arrangement, an electronic arrangement or a combination thereof. The mechanical arrangement may further comprise a plurality of apertures, holes, hollow structures or the like to engage with a corresponding arrangement in the connection interface of the connecting element 4 and form the connection. The mechanical arrangement is defined according to at least one of shape, depth, diameter, position or a combination thereof, of the plurality of apertures. The electronic arrangement comprises at least one electric contact or electronic pin.

According to another embodiment of the invention, the means 203 include the coupling arrangement comprising a keying and/or a locking arrangement on the connection interface 201 of the cleaning head 2, wherein the connection interface 201 is configured to engage with corresponding arrangement(s) on the first connection interface of the connecting element 4. Furthermore, the coupling arrangement is configured to increase strength of the connection and/or to limit the connection capability of said cleaning head 2 in relation to certain compatible connecting elements 4. In a specific example, the coupling arrangement comprises any type of locking arrangement on the connection interface 201 configured to engage with a corresponding keying arrangement in the connection interface of the connecting element 4 to ensure sealing of the connection. In another specific example, the coupling arrangement comprises any type of keying arrangement on the connection interface 201 configured to engage with a corresponding locking arrangement in the connection interface of the connecting element 4 to ensure sealing of the connection.

According to another embodiment of the invention, the material used for the connection interface 201 is selected to increase strength of the connection. The material for connection interface 201 is selected to create high friction between the connection interface 201 and corresponding connection interface of the connecting element 4. In one example, the connection interfaces of connecting element 4 and the cleaning head 2 can be made of the same or different material to create high friction, in order to make a stronger connection. In another specific example, TPE (thermoplastic elastomer) is used for connection interface 201 of the cleaning head 2 and ABS is used for the corresponding connection interface of the connecting element 4 to create high friction. In another specific example, silicone can be used for both the connection interface 201 and corresponding connection interface of the connecting element 4. In another specific example, a suitable soft material known to a person skilled in the art can be used for the connection interface 201 and a suitable hard material known to a person skilled in the art can be used for the corresponding connection interface of the connecting element 4.

According to another embodiment of the invention, the functional clearance between the connection interface 201 and corresponding connection interface of the connecting element 4 can be smaller, null or even negative and ensure a good sealing between the connecting element 4 and the cleaning head 2. This small, null or negative functional clearance results in a strong connection between the connecting element 4 and the cleaning head 2.

According to another embodiment of the invention, at least a portion of the cleaning head 2 is configured to vibrate or rotate in response to the vibrations generated by the mechanical actuator present in the base unit 6 of the oral care appliance 10.

Figure 5B:
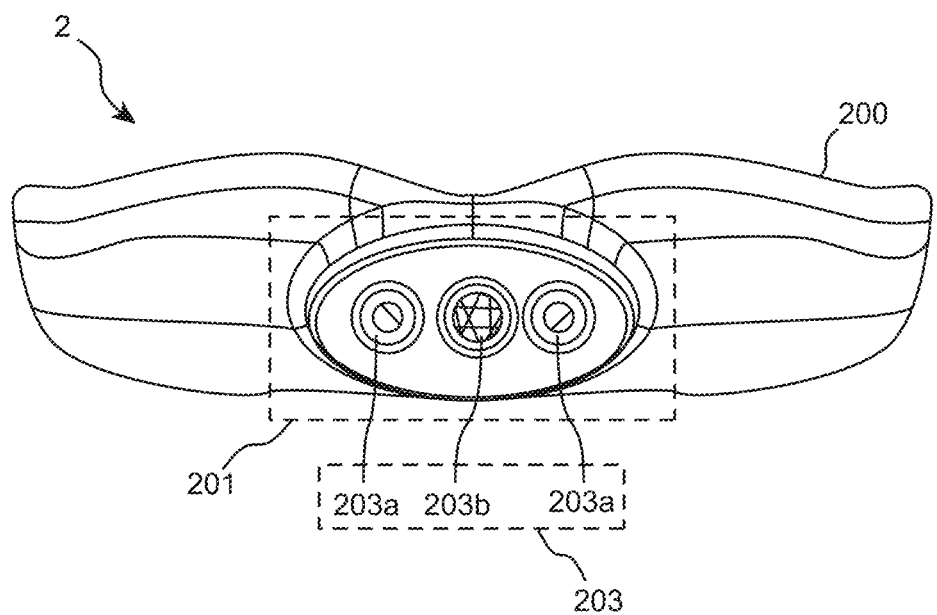
FIG. 5B illustrates a front view of a connection interface 201 comprising a plurality of aperture(s) 203a, 203b in accordance with specific embodiments of the present invention.
Figure 6:
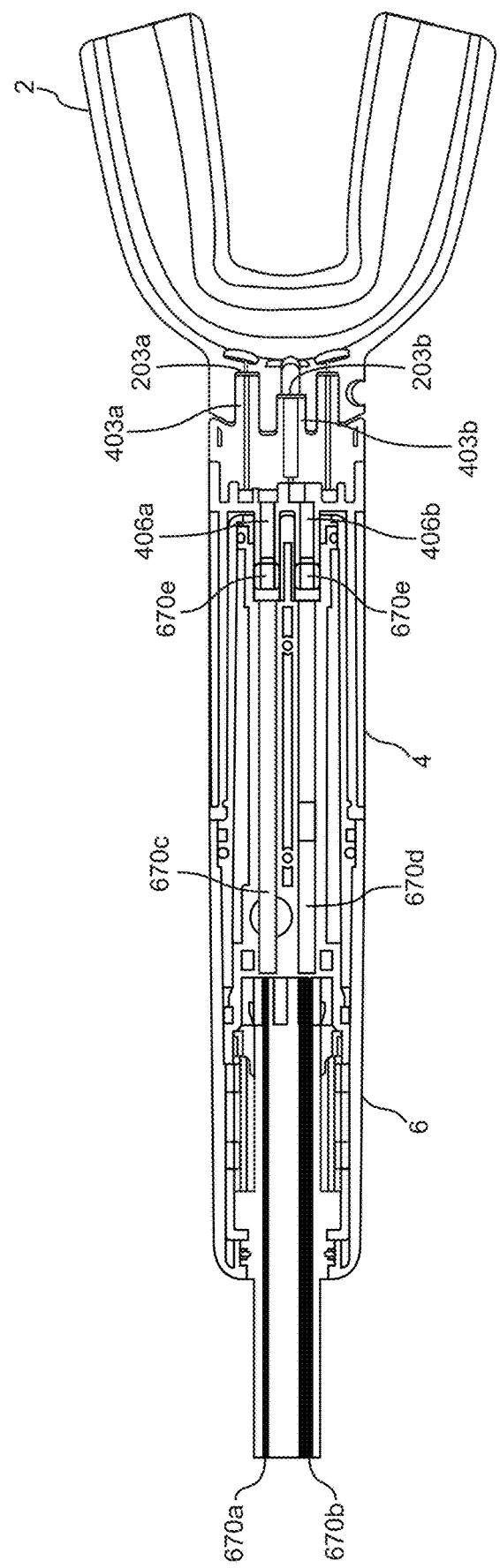
FIG. 6 illustrates a view of an oral care appliance 10 comprising a connecting element 4 connected to a cleaning head 2 and a base unit 6 in accordance with specific embodiments of the present invention.

According to another embodiment of the invention, as shown in FIG. 6, an oral care appliance 10 comprises the connecting element 4, the cleaning head 2 and the base unit 6. The connecting element 4 and the cleaning head 2 are configured to form the first connection between them. The connecting element 4 and the base unit 6 are configured to form the second connection between them. The connections are arranged such that the first connection is stronger than the second connection in order to achieve an ease of removability when different users want to use the base unit 6. The connection between the connecting element 4 and the cleaning head 2 (i.e. the first connection) is made by engaging the corresponding connection interfaces of the cleaning head 2 and the connecting element 4, whereas the connection between the connecting element 4 and the base unit 6 (i.e. the second connection) is made by engaging the connection interfaces of the cleaning head 2 and the base unit 6. The apertures 203a, 203b of the cleaning head 2 (FIG. 5B) are configured to engage with the corresponding protruding members 403a, 403b of the connecting element 4 and form the first connection.

According to another embodiment of the invention, the means 403 of the connecting element 4 and the means 203 of the cleaning head 2 ensure the sealed and stronger connection between the connecting element 4 and the cleaning head 2 (i.e. the first connection). In one example, the means 403 comprise a keying arrangement and the means 203 comprise a locking arrangement configured to form the first connection. Further, the tapered shape of the keying arrangement can ensure an easy connection between the connecting element 4 and the cleaning head 2. In another specific example, lugs on the keying arrangement can be used to ensure a good retention between the connecting element 4 and the cleaning head 2. In another specific example, the cleaning head 2 is composed of cylindrical holes with dedicated diameters (for example, between 1 mm and 8 mm) to fit the keying imposed by the connecting element 4.

According to another embodiment of the invention, the means 403 of the connecting element 4 and the means 603 of the base unit 6 are configured to arrange in a manner that facilitates disconnection of the connection interfaces of the connecting element 4 and the base unit 6. In one example, the means 603 comprise a keying arrangement and the means 403 comprise a locking arrangement configured to form the second connection.

According to another embodiment of the invention, the length, diameter, shape, position of the means 203 and means 603 is complementary to corresponding means 403 on the connecting element 4. In one example, the length of the pipes/protruding members 403a and 403b is configured to match with the depth of the aperture(s) 203a and 203b. In another example, the diameter of the connector(s) 670e and 670f is slightly larger than the member(s) 406a and 406b to facilitate easy insertion of the member(s) 406a and 406b into the connector(s) 670e and 670f of the base unit 6.

The valve(s) present in the connection interface(s) of the connecting element 4, cleaning head 2 and the base unit 6 facilitates a closed and secure connection. In one example, the valve(s) 640 present on the connector(s) 670e and 670f (as shown in FIG. 3C) are configured to be opened/pierced while making a connection with the corresponding member(s) 406a and 406b of the connecting element 4. When the connecting element 4 is being unplugged from the base unit 6, the soft valves 640 come back to the original position on the connectors 670e and 670f, thus closing them to limit the risk of cross-contamination.

Figure 7:
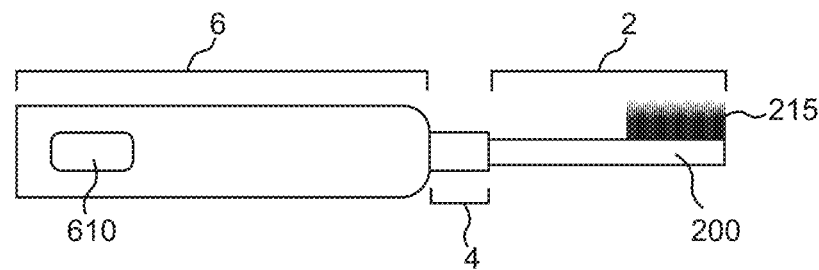
FIG. 7 illustrates an oral care appliance 10 comprising a cleaning head 2, which is a nylon brush, in accordance with specific embodiments of the present invention.

According to another embodiment of the invention as shown in FIG. 7, the cleaning head 2 comprises nylon tufts 215 or is itself a nylon brush 200. The base unit 6 comprises at least one mechanical actuator 610 configured to provide vibrations/rotations and motion to at least a portion of the cleaning head 2 through the connecting element 4. The mechanical actuator 610, can be placed on any portion of the base unit 6. In one specific example, the connecting element 4 is configured to enforce compatibility with the cleaning head 2 with the help of a keying/locking arrangement between them.

According to another embodiment of the invention, the connecting element 4 can be a simple part mounted on the cleaning head 2. In another embodiment the connecting element 4 is personalized and assigned to a specific user, thus allowing data collection on that specific user.

In specific embodiments, the connecting element 4 can be reconfigured and assigned to another user.

Figure 8:
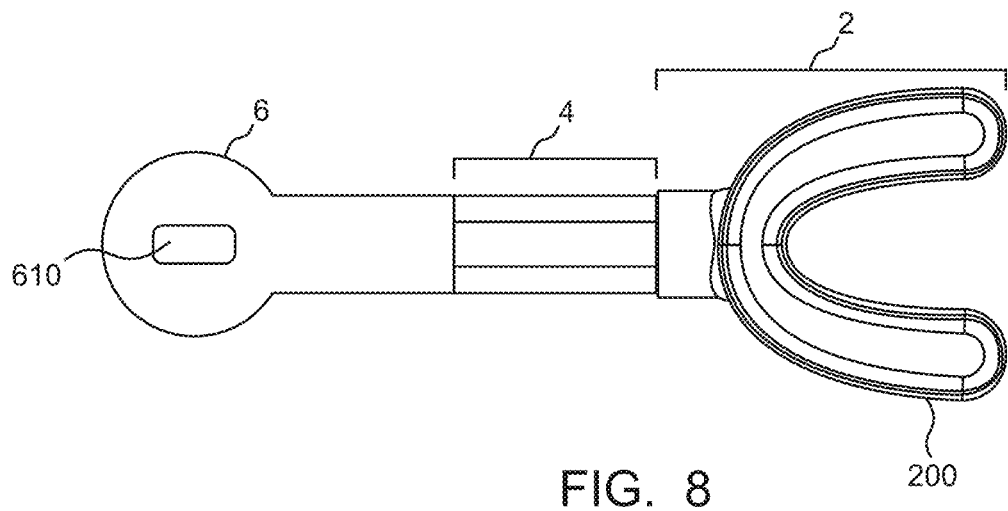
FIG. 8 illustrates an oral care appliance 10, comprising a cleaning head 2, which is a vibrating mouthpiece in accordance with specific embodiments of the present invention.

According to another embodiment of the invention, the cleaning head 2 is a mouthpiece 200 as shown in FIG. 8 that works according to vibrations. The mouthpiece 200 provides cleaning action to the dental arch of the user with the help of vibrations generated by the mechanical actuator 610 residing in the base unit 6. These vibrations are transmitted to the mouthpiece 200 through the connecting element 4. The material of the connecting element 4 and the mouthpiece 200 facilitates the transfer of vibrations through them. In one example, the connecting element 4 comprises a part made of rigid material such as metal dedicated to the transfer of vibrations to the mouthpiece 200. This part is mechanically isolated from the rest of the connecting element 4, so that the connecting element 4 would not absorb the vibrations or reduce the frequency of the vibrations while transmitting them to the mouthpiece 200 for the oral cleaning action. With the vibrating mouthpiece, the brushing cycle may be operated in form of vibration patterns of the mouthpiece 200. The brushing cycle may be adapted to operate at customizable vibration frequency range. In order to carry out the customized brushing cycle, the base unit 6 is configured to identify the user in cooperation with the identification means 440 (as shown in FIG. 2A-2B) and collect other information regarding the user, including but not limited to, number of pulsations chosen by the user, time duration for brushing cycle, operation of adapted vibrating cycles or the like with the help of the identification means 440 in the connecting element 4.

Figure 9A:
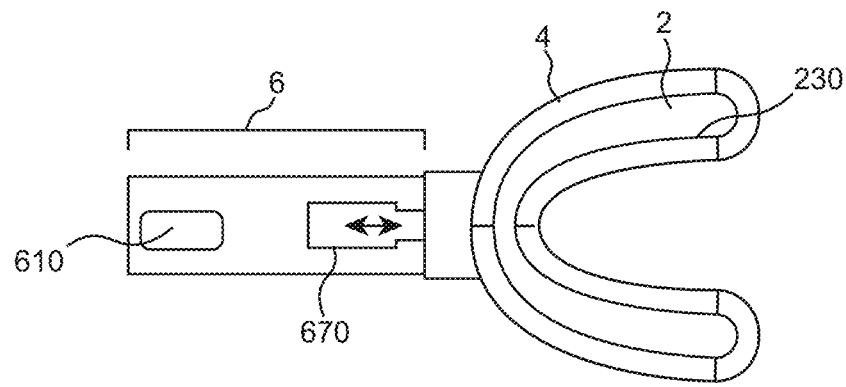
FIG. 9A illustrates an oral care appliance 10 comprising a cleaning head 2, which is an inflatable mouthpiece, in accordance with specific embodiments of the present invention.
Figure 9B:
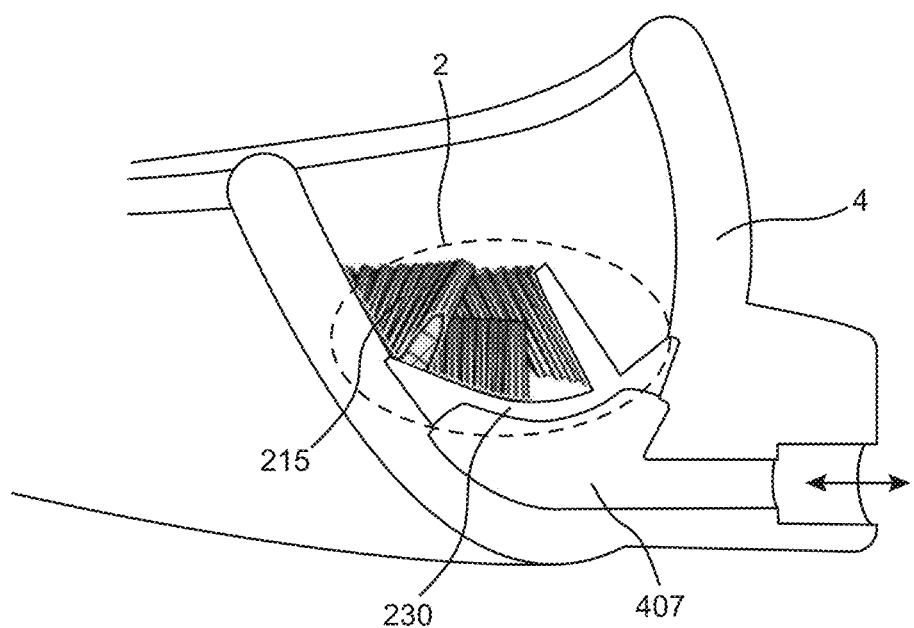
FIG. 9B illustrates a perspective view of a cleaning head 2 engaged to a connecting element 4, thereby forming an inflatable pocket 407, in accordance with specific embodiments of the present invention.

According to another embodiment of the invention as shown in FIGS. 9A and 9B, the cleaning head 2 comprises a flexible membrane 230 embedded with cleaning tips thereon. The flexible membrane 230 is configured to cooperate with at least a portion of the connecting element 4 to form at least one inflatable pocket 407. In one example, the flexible membrane 230 comprising the cleaning tips 215 can be clipped via a mechanical arrangement, ensuring a sealed connection to the connecting element 4 as shown in FIG. 9B. The base unit 6 comprises at least one mechanical actuator 610 as shown in FIG. 9A, and a connection assembly 670 for injecting or aspirating fluid (e.g. air, water) to/from the inflatable pocket 407 as shown in FIG. 9B that is configured to inflate or deflate. The flexible membrane 230 is configured to deform in response to pressure variations (that is by increasing/decreasing pressure with respect to ambient pressure) in the inflatable pocket 407, thereby resulting in at least one contraction phase and at least one relaxation phase. In one example, when the inflatable pocket 407 is filled in with fluid (e.g. air, water), it inflates due to increase in the pressure inside the inflatable pocket 407. The inflatable pocket 407 moves the cleaning tips 215 toward the dental arch of the user. Conversely, when the inflatable pocket 407 is emptied, thereby decreasing the pressure inside the inflatable pocket 407 the cleaning tips 215 move away from the user's dental arch. The mechanical arrangement of the connecting element 4 ensures the sealed and stronger connection between the connecting element 4 and the cleaning head 2. The mechanical arrangement also prevents an ill-informed user from plugging in a non-compatible cleaning head, thus preventing the oral care appliance from damage or an inefficient brushing cycle.

One or more of the above-mentioned embodiments/steps of the present invention can be automated completely or partially using one or more of a control system, timer, software, pressure sensor, or any other actuating means. The valves and the pumps as discussed in the embodiments of the invention can be controlled by the way of timer or pressure sensor.

In specific embodiments, the cycle parameters are modified according to data collected by the sensing device in order to ensure the sealing of the cavity formed between the mouth of the user and the mouthpiece 200. For instance, when the user is placing the mouthpiece 200 inside his mouth a sensor such as an accelerometer detects the movement of the handle and a contraction phase of the mouthpiece 200 is generated, i.e., the vacuum pump is activated if the contraction phase is based on a fluid aspiration. Once the user places the mouthpiece inside his mouth, the pressure sensor measures the pressure evolution inside the cavity. The data is then analyzed by the sensing device and a specific message is sent to the user accordingly to the value of the pressure via a dedicated interface such as, but not limited to a haptic signal, LED transmitted information or a notification on a smartphone. Such a communication would help the user placing the mouthpiece 200 correctly and ensure that the sealing of the cavity is good, ensuring an efficient oral care action during the brushing cycle.

Although the invention has been described with regard to its embodiments, specific embodiments and various examples, it should be understood that various changes and modifications as would be obvious to one having the ordinary skill in this art may be made without departing from the scope of the invention as set forth in the claims appended hereto.

What is claimed is:

1. A connecting element for use in an oral care appliance comprising:
   a first connection interface configured to engage operatively with a cleaning head to form a first connection in a first direction;
   a second connection interface configured to engage operatively with a base unit to form a second connection in a second direction, wherein the second direction is substantially opposite the first direction; and
   an identification means to provide an identity to the base unit;
   wherein the identification means is one of a communication module, a scannable code, and an electronic arrangement; and
   wherein the first connection interface and the second connection interface are shaped so that there is a difference between functional clearance of the first connection and the second connection, thereby making:
   (i) the first connection stronger than the second connection; and (ii) both the first connection and the second connection detachable via pull operations.

2. The connecting element according to claim 1, wherein the first connection includes one of: a mechanical coupling arrangement and an electronic coupling arrangement.

3. The connecting element according to claim 2, wherein:
   the first connection includes a mechanical coupling arrangement; and
   the mechanical coupling arrangement comprises a plurality of protruding members.

4. The connecting element according to claim 3, wherein each of said plurality of protruding members comprises at least one of a pipe, a lug, and a tube.

5. The connecting element according to claim 3, wherein the mechanical coupling arrangement is defined according to at least one of shape, length, diameter, and position of the plurality of protruding members.

6. The connecting element according to claim 1, wherein the connecting element comprises at least one valve.

7. The connecting element according to claim 1, wherein the connecting element is configured to interact with at least one mechanical actuator of the base unit to provide movement to at least a portion of the cleaning head.

8. The connecting element according to claim 1, wherein the connecting element is configured to interact with a connection assembly of the base unit to circulate fluid between the base unit and the cleaning head.

9. The connecting element according to claim 1, wherein the first connection interface is configured to cooperate with a flexible membrane of the cleaning head to form at least one inflatable pocket.

10. The connecting element according to claim 1, wherein the connecting element comprises at least one inflatable pocket; and wherein the cleaning head does not form the inflated pocket.

11. The connecting element according to claim 1, wherein the second connection interface is shaped to open at least one soft valve in the base unit when the connecting element is plugged onto the base unit.

12. The connecting element according to claim 1, wherein:
  the identification means identifies a user of the oral care appliance; and
  the identity is an identity of the identified user.

13. The connecting element according to claim 1, wherein:
  at least a portion of the connecting element and the base unit form a handle for the oral care appliance.

* * * * *